US009973923B2

(12) United States Patent
Damnjanovic et al.

(10) Patent No.: US 9,973,923 B2
(45) Date of Patent: May 15, 2018

(54) SMALL CELL ACTIVATION PROCEDURE

(71) Applicant: QUALCOMM Incorporated, San Diego, CA (US)

(72) Inventors: Aleksandar Damnjanovic, Del Mar, CA (US); Durga Prasad Malladi, San Diego, CA (US); Siddhartha Mallik, San Diego, CA (US); Naga Bhushan, San Diego, CA (US); Yongbin Wei, San Diego, CA (US); Gavin Bernard Horn, La Jolla, CA (US)

(73) Assignee: Qualcomm Incorporated, San Diego, CA (US)

( * ) Notice: Subject to any disclaimer, the term of this patent is extended or adjusted under 35 U.S.C. 154(b) by 81 days.

(21) Appl. No.: 13/830,747

(22) Filed: Mar. 14, 2013

(65) Prior Publication Data
US 2013/0279430 A1 Oct. 24, 2013

Related U.S. Application Data

(60) Provisional application No. 61/635,268, filed on Apr. 18, 2012.

(51) Int. Cl.
H04W 8/22 (2009.01)
H04W 76/02 (2009.01)
(Continued)

(52) U.S. Cl.
CPC ......... H04W 8/22 (2013.01); H04W 52/0206 (2013.01); H04W 76/023 (2013.01); H04W 84/10 (2013.01); Y02B 60/50 (2013.01)

(58) Field of Classification Search
CPC ........... H04W 72/042; H04W 72/0453; H04W 24/00; H04W 76/02; H04W 24/08;
(Continued)

(56) References Cited

U.S. PATENT DOCUMENTS 7,385,943 B2  6/2008 Nidda et al.
8,027,698 B2  9/2011 Niwano et al.
(Continued)

FOREIGN PATENT DOCUMENTS

EP  2180756 A1  4/2010
EP  2536221 A1  12/2012
(Continued)

OTHER PUBLICATIONS

"3rd Generation Partnership Project; Technical Specification Group Radio Access Network; Evolved Universal Terrestrial Radio Access (E-UTRA); Potential solutions for energy saving for E-UTRAN (Release 10)", Sep. 26, 2011 (Sep. 26, 2011), 3GPP Standard; 3GPP TR 36.927, 3rd Generation Partnership Project (3GPP), Mobile Competence Centre ; 650, Route Des Lucioles ; F-06921 Sophia Antipolis Cedex ; France, pp. 1-22, XP050554061, [retrieved on Sep. 26, 2011] paragraph [5.1.2.3].
(Continued)

Primary Examiner — Andrew Chriss
Assistant Examiner — Atique Ahmed
(74) Attorney, Agent, or Firm — Seyfarth Shaw LLP

(57) ABSTRACT

A method of wireless communication includes receiving activation parameters at a low power node and detecting a proximity of an active user equipment (UE) based at least in part on the activation parameters. The activation parameters are triggered from a node different from the low power node, such as an eNodeB. The low power node initiates an activation sequence after detecting the active UE.

17 Claims, 9 Drawing Sheets

(51) Int. Cl.
*H04W 52/02* (2009.01)
*H04W 84/10* (2009.01)

(58) Field of Classification Search
CPC ... H04W 24/10; H04W 24/02; H04W 72/085; H04L 5/0053; H04L 5/0092; H04L 5/0055; H04L 29/06027; H04L 43/08; H04M 1/72552; H04M 1/6066
USPC ......... 370/329, 498, 315; 455/403, 437, 445
See application file for complete search history.

(56) References Cited

U.S. PATENT DOCUMENTS

| | | | |
|---|---|---|---|
| 8,185,116 | B2 | 5/2012 | Wu |
| 8,326,296 | B1 | 12/2012 | O'Neil et al. |
| 2006/0025138 | A1* | 2/2006 | Kotzin .......................... 455/445 |
| 2008/0090522 | A1 | 4/2008 | Oyama |
| 2008/0225796 | A1* | 9/2008 | Malladi et al. ................ 370/331 |
| 2009/0252073 | A1 | 10/2009 | Kim et al. |
| 2010/0158050 | A1* | 6/2010 | Yang ............................. 370/498 |
| 2010/0167743 | A1* | 7/2010 | Palanki .................. H04B 7/155 455/436 |
| 2010/0182974 | A1* | 7/2010 | Barraclough et al. ........ 370/329 |
| 2010/0238826 | A1* | 9/2010 | Borran et al. ................. 370/252 |
| 2011/0070880 | A1 | 3/2011 | Song et al. |
| 2011/0096748 | A1* | 4/2011 | Meyer ................ H04W 74/006 370/329 |
| 2011/0116439 | A1* | 5/2011 | Kawasaki ............ H04L 5/0044 370/315 |
| 2011/0164584 | A1* | 7/2011 | Seo et al. ...................... 370/329 |
| 2011/0222428 | A1* | 9/2011 | Charbit .............. H04B 7/15557 370/252 |
| 2011/0267978 | A1 | 11/2011 | Etemad |
| 2011/0268101 | A1 | 11/2011 | Wang et al. |
| 2012/0058797 | A1 | 3/2012 | Gaal et al. |
| 2012/0082088 | A1* | 4/2012 | Dalsgaard et al. ........... 370/315 |
| 2012/0157099 | A1 | 6/2012 | Matsumoto |
| 2012/0214512 | A1 | 8/2012 | Siomina et al. |
| 2012/0263054 | A1 | 10/2012 | Kazmi et al. |
| 2012/0289178 | A1* | 11/2012 | Matsumura et al. ......... 455/403 |
| 2012/0289247 | A1 | 11/2012 | Siomina et al. |
| 2012/0302240 | A1 | 11/2012 | Tamaki et al. |
| 2012/0322452 | A1* | 12/2012 | Samuel et al. ................ 455/437 |
| 2013/0028200 | A1* | 1/2013 | Nory ......................... H04L 1/08 370/329 |
| 2013/0281076 | A1 | 10/2013 | Damnjanovic et al. |

FOREIGN PATENT DOCUMENTS

| | | |
|---|---|---|
| EP | 2536232 A1 | 12/2012 |
| JP | H08204629 A | 8/1996 |
| JP | 2008098931 A | 4/2008 |
| JP | 2011049859 A | 3/2011 |
| WO | 2008137376 A2 | 11/2008 |
| WO | 2011024476 A1 | 3/2011 |
| WO | 2011099511 A1 | 8/2011 |
| WO | 2011099513 A1 | 8/2011 |

OTHER PUBLICATIONS

International Search Report and Written Opinion—PCT/US2013/032363—ISA/EPO—dated Jun. 27, 2013.
Mitsubishi Electric: "Energy Saving for HeNBs", 3GPP Draft; R3-100201 (Energysavingforhenbs), 3rd Generation Partenership Project (3GPP), Mobile Competence Centre; 650, Route Des Lucioles; F-06921 Sophia-Antipolis Cedex; France, vol. RAN WG3, no. Valencia, Spain; Jan. 18, 2010, Jan. 15, 2010 (Jan. 15, 2010), pp. 1-3, XP050424063, [retrieved on Jan. 15, 2010] the whole document.

\* cited by examiner

SMALL CELL ACTIVATION PROCEDURE

CROSS-REFERENCE TO RELATED APPLICATION

This application claims the benefit under 35 U.S.C. § 119(e) to U.S. Provisional Patent Application No. 61/635,268 entitled RELAY ACTIVATION PROCEDURE, filed on Apr. 18, 2012, the disclosure of which is expressly incorporated by reference herein in its entirety.

The present application is related to U.S. patent application Ser. No. 13/830,702, entitled "SMALL CELL ACTIVATION PROCEDURE," in the names of Damnjanovic et al., filed on Mar. 14, 2013, the disclosure of which is expressly incorporated by reference herein in its entirety.

BACKGROUND

Field

Aspects of the present disclosure relate generally to wireless communication systems, and more particularly to controlling small cell activity states.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

According to an aspect of the present disclosure, a method of wireless communication is presented. The method includes receiving activation parameters at a low power node. The method also includes detecting a proximity of an active user equipment (UE) based at least in part on the activation parameters. The method further includes initiating an activation sequence after detecting the active UE.

In another aspect of the present disclosure, a computer program product for wireless communications in a wireless network having a non-transitory computer-readable medium is disclosed. The computer readable medium has program code recorded thereon which, when executed by the processor(s), causes the processor(s) to perform operations of receiving activation parameters at a low power node. The program code also causes the processor(s) to detect a proximity of an active UE based at least in part on the activation parameters. The program code also causes the processor(s) to initiate an activation sequence after detecting the active UE.

Another aspect of the present disclosure discloses an apparatus for wireless communication having a memory and at least one processor coupled to the memory. The processor(s) is configured to receive activation parameters at a low power node. The processor(s) is also configured to detect a proximity of an active UE based at least in part on the activation parameters. The processor(s) is further configured to initiate an activation sequence after detecting the active UE.

According to still another aspect of the present disclosure, an apparatus is presented. The apparatus includes means for receiving activation parameters at a low power node. The apparatus also includes means for detecting a proximity of an active UE based at least in part on the activation parameters. The apparatus further includes means for initiating an activation sequence after detecting the active UE.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
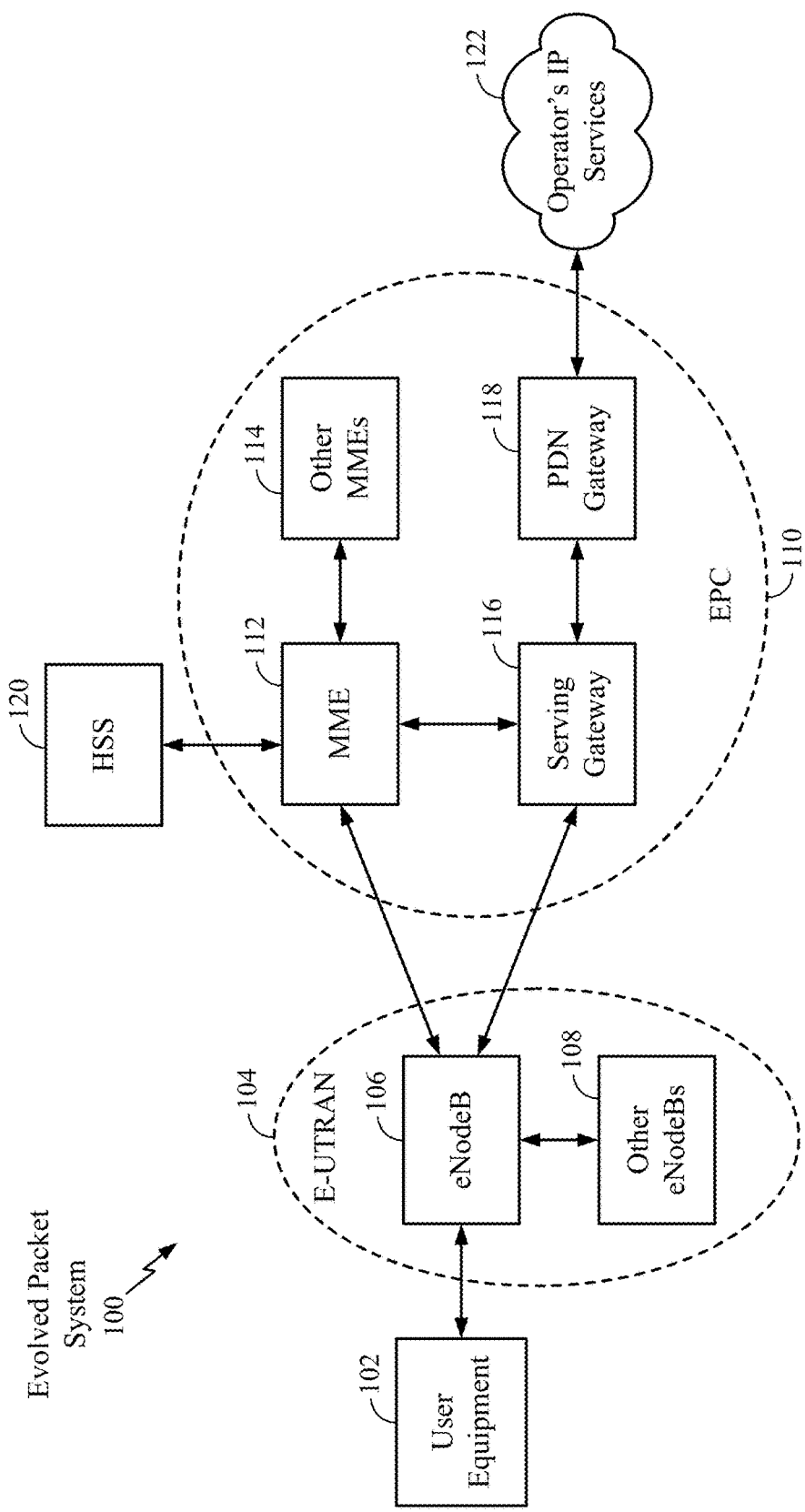
FIG. 1 is a diagram illustrating an example of a network architecture.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Aspects of the telecommunication systems are presented with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise. For clarity, certain aspects of the techniques are described for LTE or LTE-Advanced (LTE-A) (together referred to as "LTE") and use such LTE terminology in much of the description.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNodeB) 106 and other eNodeBs 108. The eNodeB 106 provides user and control plane protocol terminations toward the UE 102. The eNodeB 106 may be connected to the other eNodeBs 108 via a backhaul (e.g., an X2 interface). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a tablet, a netbook, a smartbook, an ultrabook, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected to the EPC 110 via, e.g., an S1 interface. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS (packet switched) Streaming Service (PSS).

Figure 2:
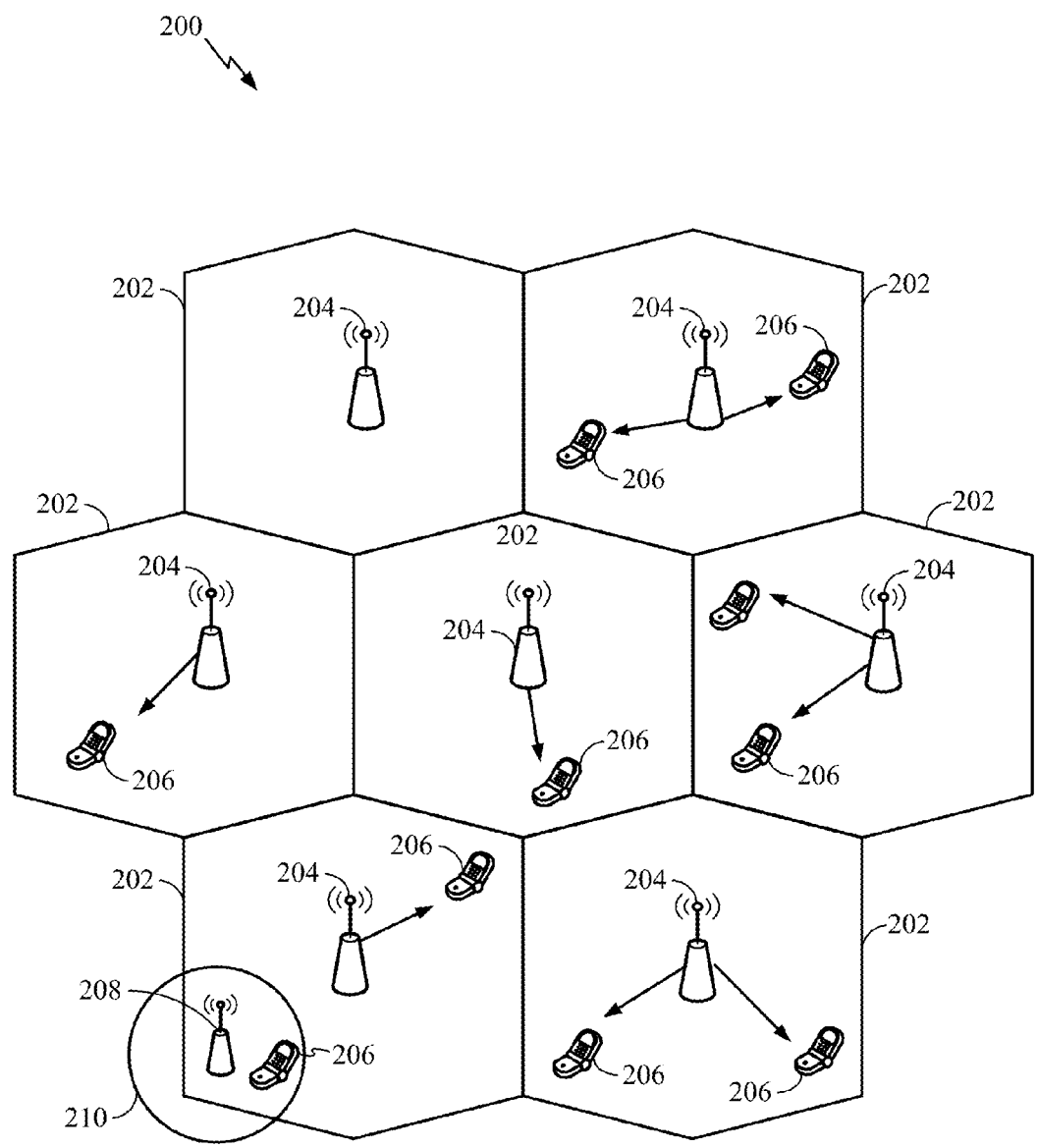
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNodeBs 208 may have cellular regions 210 that overlap with one or more of the cells 202. A lower power class eNodeB 208 may be a remote radio head (RRH), a femto cell (e.g., home eNodeB (HeNB)), a pico cell, or a micro cell. The macro eNodeBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the downlink and SC-FDMA is used on the uplink to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 206 with different spatial signatures, which enables each of the UE(s) 206 to recover the one or more data streams destined for that UE 206. On the uplink, each UE 206 transmits a spatially precoded data stream, which enables the eNodeB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 3:
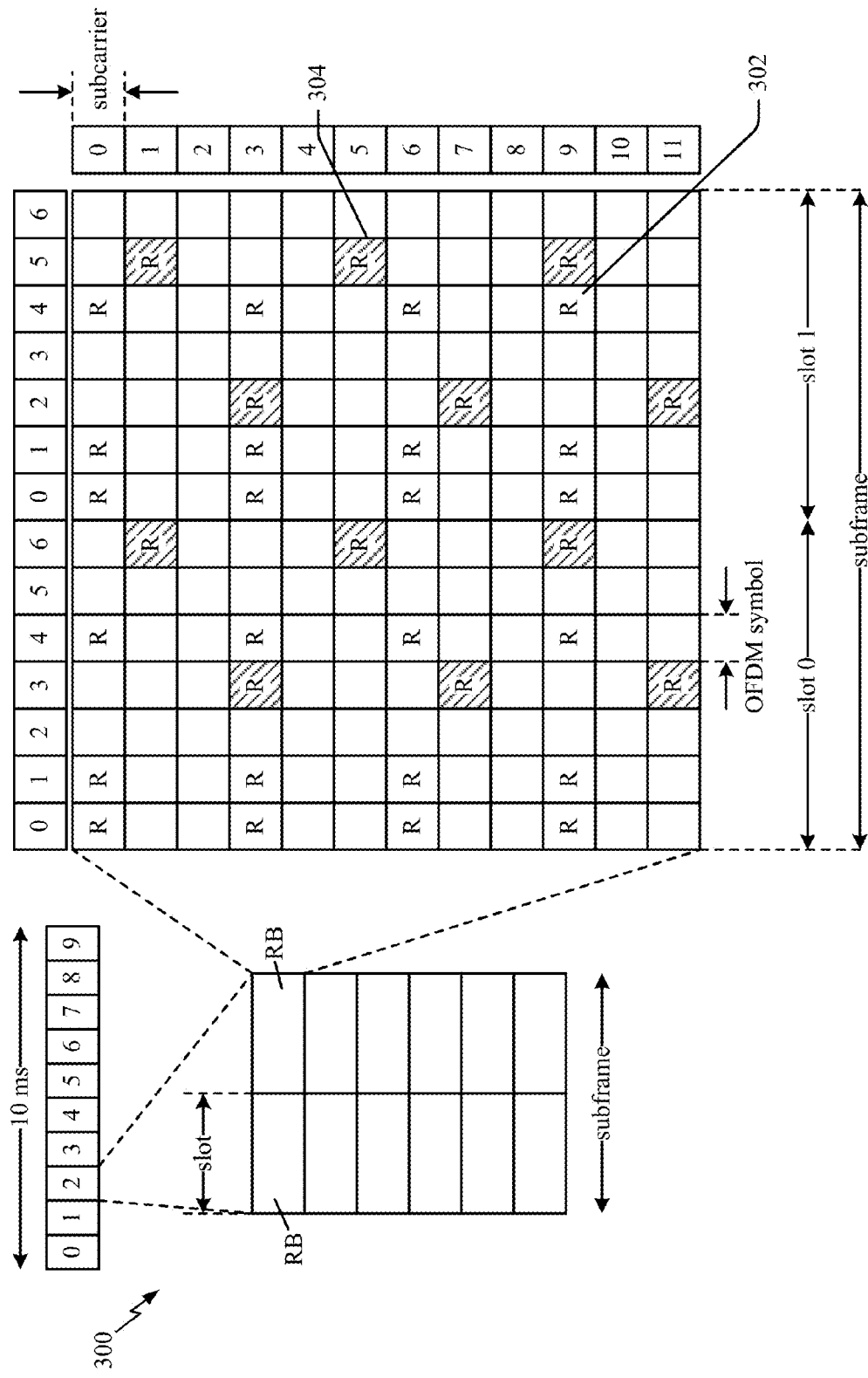
FIG. 3 is a diagram illustrating an example of a downlink frame structure in LTE.

FIG. 3 is a diagram 300 illustrating an example of a downlink frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, R 304, include downlink reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 4:
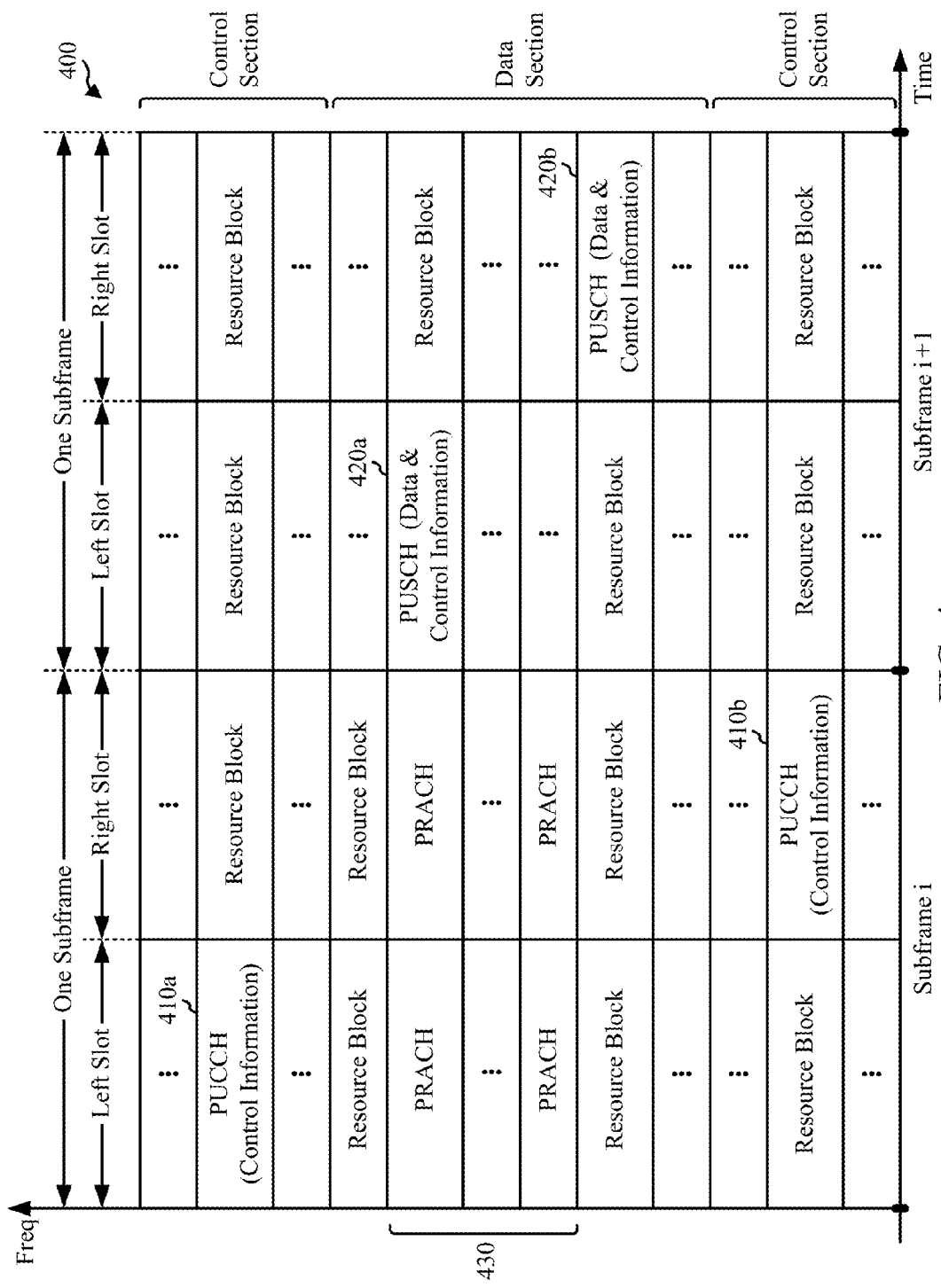
FIG. 4 is a diagram illustrating an example of an uplink frame structure in LTE.

FIG. 4 is a diagram 400 illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 410a, 410b in the control section to transmit control information to an eNodeB. The UE may also be assigned resource blocks 420a, 420b in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An uplink transmission may span both slots of a subframe and may hop across frequency.

A set of resource blocks may be used to perform initial system access and achieve uplink synchronization in a physical random access channel (PRACH) 430. The PRACH 430 carries a random sequence and cannot carry any uplink data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
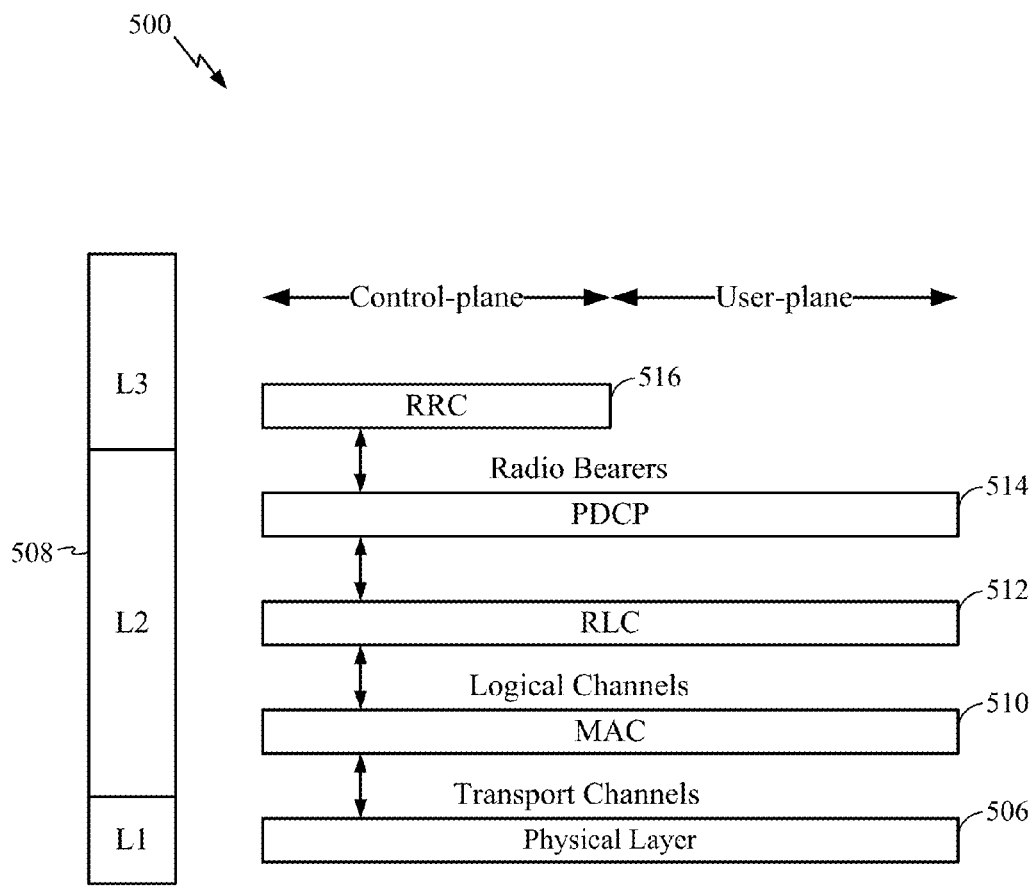
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNodeB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNodeB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNodeB and the UE.

Figure 6:
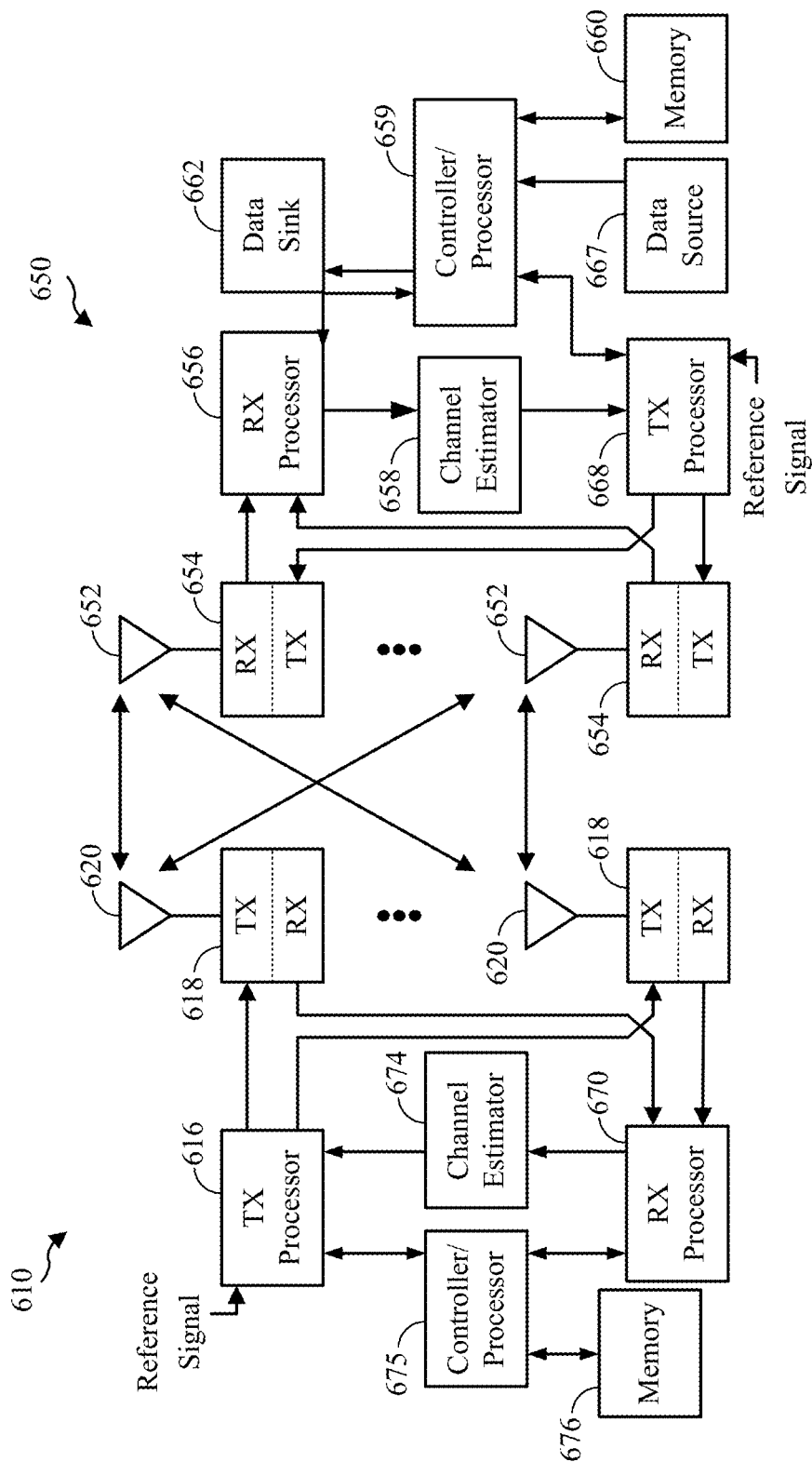
FIG. 6 is a diagram illustrating an example of an evolved Node B and user equipment in an access network.

FIG. 6 is a block diagram of an eNodeB 610 in communication with a UE 650 in an access network. In the downlink, upper layer packets from the core network are provided to a controller/processor 675. The controller/processor 675, e.g., implements the functionality of the L2 layer. In the downlink, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616, e.g., implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter/modulator 618TX. Each transmitter 618TX modulates an RF carrier with a respective spatial stream for transmission.

At the UE 650, each receiver/demodulator 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 658. The soft decisions are then decoded and deinterleaved to recover the data and control signals that were originally transmitted by the eNodeB 610 on the physical channel. The data and control signals are then provided to the controller/processor 659.

The controller/processor 659, e.g., implements the L2 layer. The controller/processor can be associated with a memory 660 that stores program codes and data. The memory 660 may be referred to as a computer-readable medium. In the uplink, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the uplink, a data source 667 is used to provide upper layer packets to the controller/processor 659. The data source 667 represents all protocol layers above the L2 layer. Similar to the functionality described in connection with the downlink transmission by the eNodeB 610, the controller/processor 659 implements the L2 layer for the user plane and the control plane by providing header compression, ciphering, packet segmentation and reordering, and multiplexing between logical and transport channels based on radio resource allocations by the eNodeB 610. The controller/processor 659 is also responsible for HARQ operations, retransmission of lost packets, and signaling to the eNodeB 610.

Channel estimates derived by a channel estimator 658 from a reference signal or feedback transmitted by the eNodeB 610 may be used by the TX processor 668 to select the appropriate coding and modulation schemes, and to facilitate spatial processing. The spatial streams generated by the TX processor 668 are provided to different antenna 652 via separate transmitters/modulators 654TX. Each transmitter 654TX modulates an RF carrier with a respective spatial stream for transmission.

The uplink transmission is processed at the eNodeB 610 in a manner similar to that described in connection with the receiver function at the UE 650. Each receiver/demodulator 618RX receives a signal through its respective antenna 620. Each receiver 618RX recovers information modulated onto an RF carrier and provides the information to a RX processor 670. The RX processor 670 may, e.g., implement the L1 layer.

The controller/processor 675, e.g., implements the L2 layer. The controller/processor 675 can be associated with a memory 676 that stores program codes and data. The memory 676 may be referred to as a computer-readable medium. In the uplink, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations. The controller/processor 675 and the controller/processor 659 may direct the operation at the eNodeB 610 and the UE 650, respectively. The controller/processor 675 or other processors and modules at the eNodeB 610 may perform or direct the execution of various processes for the techniques described herein. The controller/processor 659 or other processors and modules at the UE 650 may also perform or direct the execution of various processes for the techniques described herein. The memory 676 and the memory 660 may store data and program codes for the eNodeB 610 and the UE 650, respectively.

Although the description of FIG. 6 is with respect to the eNodeB 610 and the UE 650, when a small cell is involved, either the apparatus 610 or 650 can be a small cell. For example, if UE to small cell communications are considered, the small cell may correspond to the apparatus 610. For example, if small cell to eNodeB communications are considered, the small cell may correspond to the apparatus 650. The small cell may comprise a relay or relay station, an eNodeB, or a UE. The small cell may be a low power node with either a wired or wireless backhaul link Aspects of the present disclosure are directed to activating a small cell based on the proximity of an active UE. Specifically, the small cell may be activated based on transmissions on existing physical uplink (UL) channels from the active UE. The physical uplink channel transmissions may include a random access channel transmission, such as a physical random access channel (PRACH) signature sequence, or a reference signal, such as a sounding reference signal (SRS). The small cell may be referred to as a relay or a low power node. Additionally, the small cell may have either a wired or wireless backhaul link.

Figure 7:
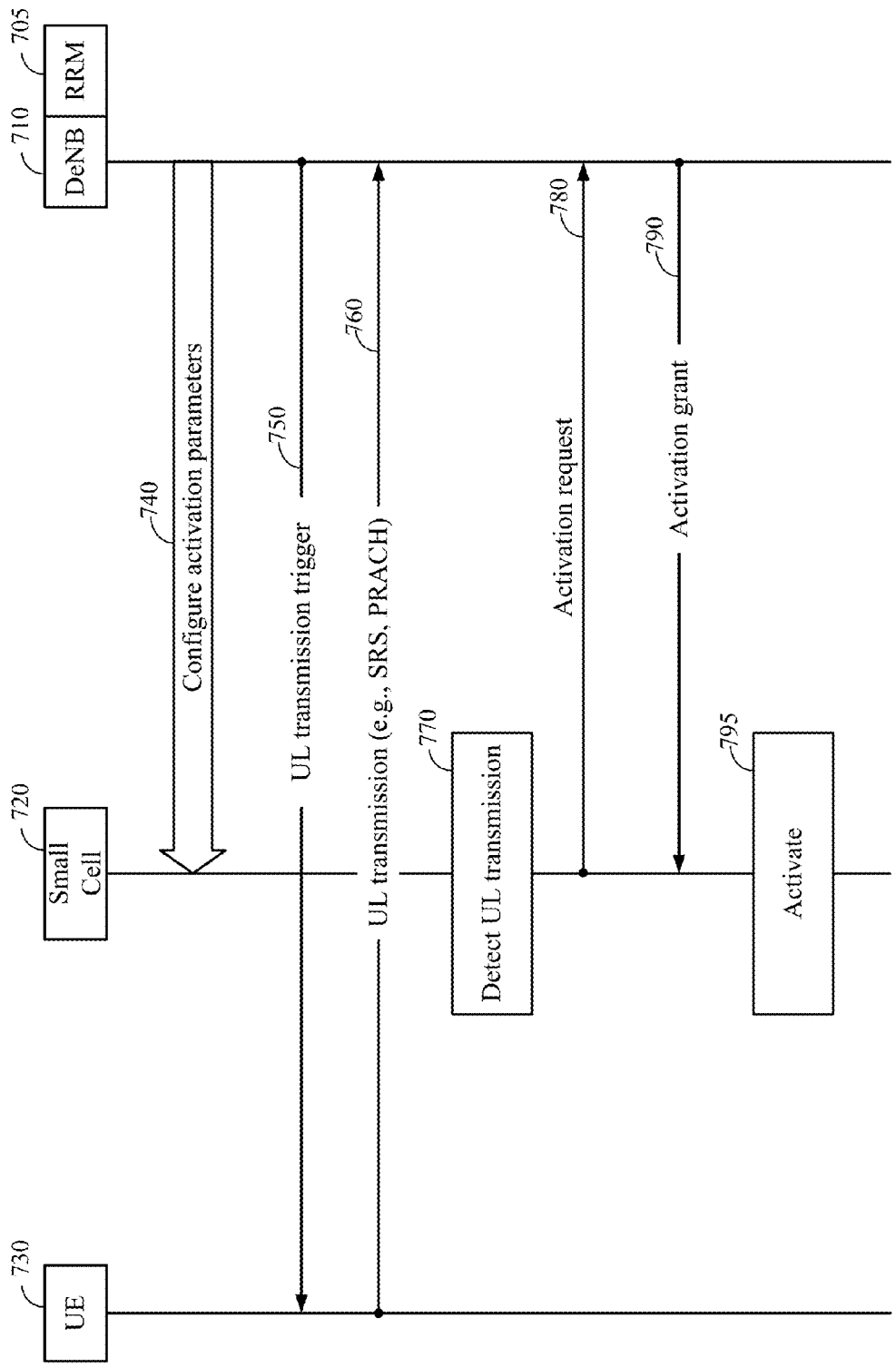
FIG. 7 is a call flow diagram conceptually illustrating an exemplary small cell activation process according to an aspect of the present disclosure.

FIG. 7 illustrates an exemplary call flow diagram for a small cell activation procedure according to an aspect of the present disclosure. As illustrated in FIG. 7, the donor eNodeB 710 may include, or be coupled to, a radio resource management (RRM) server 705. At time 740, the donor eNodeB 710 may configure the small cell 720 with activation parameters. For example, the small cell 720 is informed of where to search for the UE 730. The activation parameters may indicate a physical random access channel (PRACH) signature sequence space, time/frequency resources, uplink transmission signal parameters, etc. The small cell 720 may use the activation parameters to determine the proximity of the UE 730.

Furthermore, at time 750, the donor eNodeB 710 may trigger the UE 730 to transmit on an uplink channel. In one configuration, the donor eNodeB 710 transmits a control channel order, such as a physical downlink control channel (PDCCH) order at time 750, to trigger an uplink transmission from the UE 730. In another configuration, the uplink transmission may be semi-statically configured. The triggering of the UE 730 at time 750 is optional, and thus it will not occur in certain configurations.

In response to receiving the uplink trigger (e.g., control channel order), at time 760, the UE 730 transmits an uplink transmission, such as a random access channel transmission. The uplink transmission includes a signature sequence, such as a random access channel signature sequence, or a reference signal, such as a sounding reference signal (SRS). As mentioned, the uplink transmission could also occur without being triggered.

At time 770, the small cell 720 detects the uplink transmission from the UE 730. The small cell 720 may initiate a network activation or an autonomous activation based on the detected uplink transmission. Specifically, in one configuration, the small cell 720 initiates a network activation or an autonomous activation if the uplink transmission satisfies the threshold values provided in the activation parameters.

In one configuration, when a network activation is specified for the small cell 720, at time 780, the small cell 720 transmits an activation request to the donor eNodeB 710. In response to receiving the activation request, at time 790, the donor eNodeB 710 may transmit an activation grant so that the small cell 720 may power up at time 795. In another configuration, when an autonomous activation is specified, the call flow proceeds from time 770 directly to time 795.

As previously discussed, according to one aspect of the present disclosure, the donor eNodeB 710 configures the small cell 720 with activation parameters. The activation parameters enable the small cell 720 to detect the proximity of the UE 730. Moreover, the activation parameters may include a random access channel signature sequence space, time/frequency resources, uplink sounding transmission signal parameters, such as a sounding reference signal, etc. For random access channel parameters, the small cell may be configured based on the serving cell's random access channel configuration and/or the random access channel configuration of a neighboring cell.

In one configuration, the activation parameters also include threshold values. For example, the threshold value may include a signal strength threshold. In this example, the small cell may determine whether the UE is considered to be within a distance that warrants activating the small cell when the signal strength is greater than or equal to the signal strength threshold. Alternatively or in addition, the activation parameters include interference threshold values.

As illustrated in FIG. 7, the donor eNodeB may dynamically trigger the UE to transmit on the uplink using a reserved set of signature sequences, time resources, and/or frequency resources. The triggering may be based on criteria observed by the donor eNodeB, such as, data load or radio conditions. That is, for example, the donor eNodeB may transmit the uplink trigger for UEs with a high downlink data load. Alternatively, the donor eNodeB may semi-statically configure a periodic or an event based trigger for uplink transmissions during network setup.

In one configuration, the small cell searches for specific uplink transmissions, such as a random access channel signal, based on all possible configurations. Still, the number of possible configurations may be limited. For example, according to one configuration, the small cell is limited to search for dedicated preambles activated via an uplink trigger, such as the downlink control channel order. Because the small cell is searching for a reserved set of signature sequences, the small cell will not activate in response to uplink transmissions, such as random access channel transmissions, that are transmitted during an initial access phase of a UE.

As further illustrated in FIG. 7, according to one configuration, the UE transmits an uplink message, such as a random access channel signature sequence or another signal. Because a typical cyclic prefix of a random access channel signature sequence is large, a random access channel signature sequence is used to handle timing uncertainty. The uplink transmission may be on the same carrier frequency used for uplink data transmission to the donor eNodeB (e.g., 2 GHz) or a carrier frequency of an access link to a small cell (e.g., 3.6 GHz). Furthermore, the UE may be configured to select a random access channel signature sequence from a pool of signature sequences to convey additional information from the UE, such as radio conditions, data loading, or power headroom (e.g., transmission power). According to one configuration, the uplink transmission is transmitted with full power or a fixed power level.

According to another configuration, the UE only transmits the random access channel signature sequence and does not continue with the random access procedure. That is, the UE does not monitor for a random access response from the donor eNodeB. This may be achieved with an uplink trigger, such as a downlink control channel order, or without an uplink trigger so that the transmission of the activation parameters is periodic (e.g., periodic random access channel based sounding). According to another configuration, the donor eNodeB does not proceed with the typical random access channel procedure in response to receiving the random access channel transmission from the UE.

As previously discussed, the small cell may detect the signature sequence transmitted by the UE via the uplink transmission. In one configuration, the small cell autonomously activates and initiates a power ramp up procedure if the small cell detects a sufficiently strong signal that satisfies the criteria in the activation parameters. Alternatively, upon detecting a signal that is greater than or equal to a signal strength threshold, the small cell may transmit an activation request to the network (e.g., donor eNodeB or radio resource management server).

According to one configuration, the activation request includes a report, such as a random access channel signature measurement report. Specifically, the report may include the signal strength of the uplink transmission, other measurements, such as a signal to interference noise ratio (SINR), and/or time and frequency resources. The other measurements may assist the donor eNodeB in determining the specific UE that transmitted the signature sequence.

The donor eNodeB may transmit an activation grant upon receiving the activation request from the small cell. Specifically, the radio resource management server may determine a group of small cells that have detected the same UE. Multiple small cells are typically not activated for the same UE, and therefore, the radio resource management server may transmit the activation request to other radio resource management servers associated with neighboring donor eNodeBs to coordinate activation grants. Alternatively, according to another configuration, one radio resource management server may be associated with multiple donor eNodeBs. Therefore, the radio resource management server does not coordinate with other radio resource management servers. In transmitting the activating grant, the network may improve or even optimize the number of activated small cells. The small cell may activate and initiate a power ramp up procedure after receiving the activation grant.

According to another configuration, the activation procedure piggy-backs on a current handover procedure with tunneled information (e.g. common or dedicated random access channel) so that the UE may transmit using the random access channel. That is, each node, regardless of whether the node is an eNodeB or a small cell (e.g., UeNB), may remain in a dormant state, until the node has detected a random access channel transmission from a UE. The node may transition from a dormant state to an active state in the access link after detecting the random access channel transmission from the UE. This configuration may be an alternative to the uplink triggering (e.g., downlink control channel order).

Figure 8:
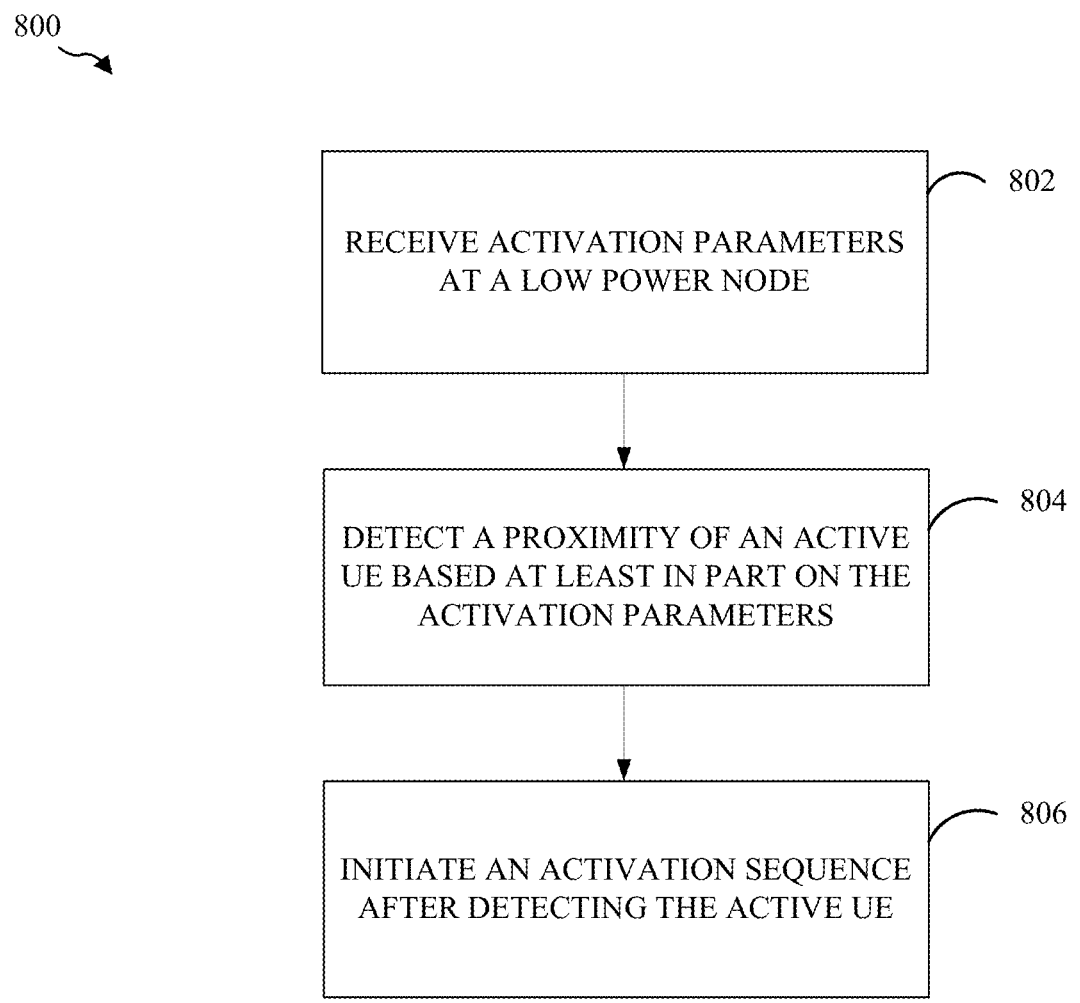
FIG. 8 is a block diagram illustrating a method for activating a small cell according to an aspect of the present disclosure.

FIG. 8 illustrates a method 800 for activating a low power node, such as a small cell. In block 802, a low power node receives an activation parameter. Additionally, the low power node detects the proximity of an active UE based at least in part on the activation parameters in block 804. In one configuration, the activation parameters are triggered from a node that is different from the low power node, such as a donor eNodeB. Furthermore, at block 806, the low power node initiates an activation sequence after the active UE is detected.

In one configuration, the small cell (e.g., eNodeB 610 or UE 650, depending on configuration) is configured for wireless communication including means for receiving. In one configuration, the receiving means may include the controller/processor 675, memory 676, receive processor 670, demodulators 618, and/or antenna 620 configured to perform the functions recited by the receiving means. In another configuration, the receiving means may include the controller/processor 659, memory 660, receive processor 656, demodulators 654, and/or antenna 652 configured to perform the functions recited by the receiving means.

The small cell is also configured to include a means for detecting. In one configuration, the detecting means may include the controller/processor 675, memory 676, receive processor 670, demodulators 618, and/or antenna 620 configured to perform the functions recited by the detecting means. In another configuration, the detecting means may include the controller/processor 659, memory 660, receive processor 656, demodulators 654, and/or antenna 652 configured to perform the functions recited by the detecting means.

The small cell is also configured to include a means for activating. In one configuration, the activating means may include the receive processor 670, transmit processor 616, demodulators 618, and/or controller/processor 675 configured to perform the functions recited by the activating means. In another configuration, the activating means may include the controller/processor 659, memory 660, and/or receive processor 656, configured to perform the functions recited by the detecting means.

In another configuration, the aforementioned means may be any module or any apparatus configured to perform the functions recited by the aforementioned means.

Figure 9:
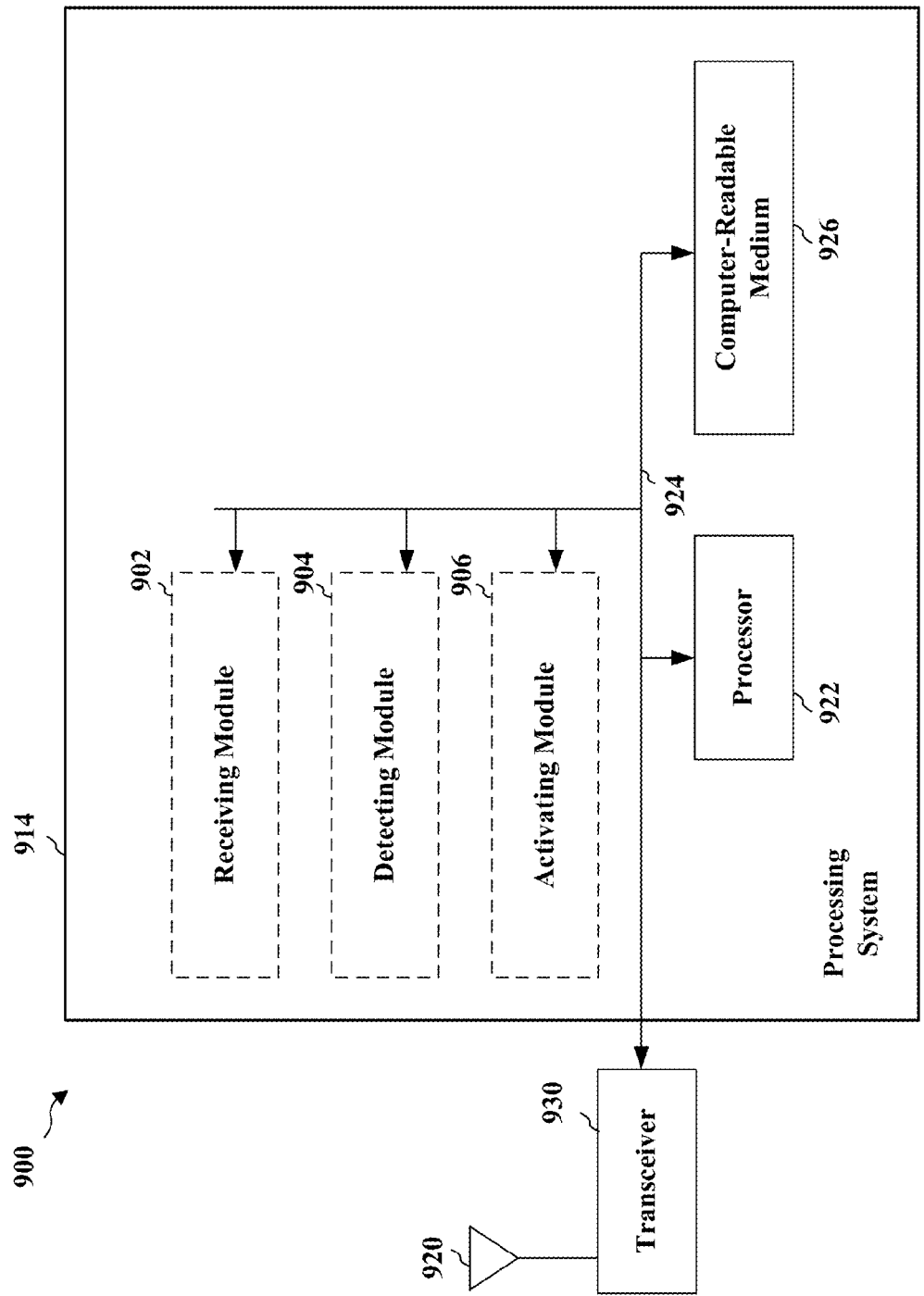
FIG. 9 is a block diagram illustrating different modules/means/components in an exemplary apparatus.

FIG. 9 is a diagram illustrating an example of an implementation (e.g., a hardware implementation) for an apparatus 900 employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various modules/circuits including one or more processors and/or modules (e.g., hardware modules), represented by the processor 922 the modules 902, 904, 906 and the computer-readable medium 926. The bus 924 may also link various other modules/circuits such as timing sources, peripherals, voltage regulators, and power management circuits, which are well known in the art, and therefore, will not be described any further.

The apparatus includes a processing system 914 coupled to a transceiver 930. The transceiver 930 is coupled to one or more antennas 920. The transceiver 930 enables communicating with various other apparatus over a transmission medium. The processing system 914 includes a processor 922 coupled to a computer-readable medium 926. The processor 922 is responsible for general processing, including the execution of software stored on the computer-readable medium 926. The software, when executed by the processor 922, causes the processing system 914 to perform the various functions described for any particular apparatus. The computer-readable medium 926 may also be used for storing data that is manipulated by the processor 922 when executing software.

The processing system 914 includes a receiving module 902 for receiving activation parameters. The processing system 914 also includes a detecting module 904 for detecting an active UE based at least in part on the activation parameters. The processing system 914 may further include an activating module 906 for initiating an activation sequence after the active UE is detected. The modules may be software modules running in the processor 922, resident/stored in the computer-readable medium 926, one or more hardware modules coupled to the processor 922, or some combination thereof. In one configuration, if UE to small cell communications are considered, the processing system 914 may be a component of the eNodeB 610 and may include the memory 676, and/or the controller/processor 675. In another configuration, if small cell to eNodeB communications are considered, the processing system 914 may be a component of the UE 650 and may include the memory 660, and/or the controller/processor 659.

Those of skill would further appreciate that the various illustrative logical blocks, modules, circuits, and algorithm steps described in connection with the disclosure herein may be implemented as hardware, software, or a combination thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination thereof. A software module may reside in RAM memory, flash memory, ROM memory, EPROM memory, EEPROM memory, PCM (phase change memory), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, or combinations thereof. If implemented in software, the functions may be stored, encoded as one or more instructions or code, or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure.

Thus, the disclosure is not intended to be limited to the examples and designs described herein but is to be accorded the widest scope consistent with the principles and novel features disclosed herein.

What is claimed is:

1. A method of wireless communication, comprising:
receiving, at a low power node from a base station, activation parameters to activate the low power node to detect an uplink transmission between an active user equipment (UE) and the base station;
determining, at the low power node, a proximity of the active user equipment (UE) relative to the low power node upon detecting the uplink transmission based at least in part on the activation parameters, the uplink transmission transmitted in response to a trigger directly transmitted from the base station to the active UE, the activation parameters indicating at least one of a physical random access channel (PRACH) signature sequence space, time resources, frequency resources, or a combination thereof, of the uplink transmission; and
initiating, at the low power node, an activation sequence between the low power node and the base station after determining the proximity of the active UE.

2. The method of claim 1, further comprising
transmitting an activation request when the proximity of the active UE is determined; and
receiving an activation grant in response to the activation request, the activation grant being received prior to initiating the activation sequence.

3. The method of claim 1, in which the activation parameters are based at least in part on at least one of a serving cell PRACH configuration, a neighbor cell PRACH configuration, or a combination thereof.

4. The method of claim 1, in which the PRACH signature sequence does not trigger a PRACH procedure.

5. The method of claim 1, in which determining the proximity of the active UE occurs subsequent to dynamic or periodic triggering of:
a PRACH transmission, or
a backward handover procedure.

6. A low power node for wireless communications, comprising:
a memory; and
at least one processor coupled to the memory, the at least one processor being configured to:
receive, from a base station, activation parameters to activate the low power node to detect an uplink transmission between an active user equipment (UE) and the base station;
determine a proximity of the active user equipment (UE) relative to the low power node upon detecting the uplink transmission based at least in part on the activation parameters, the uplink transmission transmitted in response to a trigger directly transmitted from the base station to the active UE, and the activation parameters indicating at least one of a physical random access channel (PRACH) signature sequence space, time resources, frequency resources, or a combination thereof, of the uplink transmission; and
initiate an activation sequence between the low power node and the base station after determining the proximity of the active UE.

7. The low power node of claim 6, in which the at least one processor is further configured to:
transmit an activation request when the proximity of the active UE is determined; and
receive an activation grant in response to the activation request, the activation grant being received prior to initiating the activation sequence.

8. The low power node of claim 6, in which the activation parameters are based at least in part on at least one of a serving cell PRACH configuration, a neighbor cell PRACH configuration, or a combination thereof.

9. The low power node of claim 6, in which the PRACH signature sequence does not trigger a PRACH procedure.

10. The low power node of claim 6, in which the at least one processor is further configured to determine the proximity of the active UE subsequent to dynamic or periodic triggering of:
a PRACH transmission, or
a backward handover procedure.

11. An apparatus for wireless communications, comprising:
means for receiving, at a low power node from a base station, activation parameters to activate the low power node to detect an uplink transmission between an active user equipment (UE) and the base station;
means for determining, at the low power node, a proximity of the active user equipment (UE) relative to the low power node upon detecting the uplink transmission based at least in part on the activation parameters, the uplink transmission transmitted in response to a trigger directly transmitted from the base station to the active UE, and the activation parameters indicating at least one of a physical random access channel (PRACH) signature sequence space, time resources, frequency resources, or a combination thereof, of the uplink transmission; and
means for initiating, at the low power node, an activation sequence between the low power node and the base station after determining the proximity of the active UE.

12. The apparatus of claim 11, further comprising:
means for transmitting an activation request when the proximity of the active UE is determined; and
means for receiving an activation grant in response to the activation request, the activation grant being received prior to the initiating of the activation sequence.

13. The apparatus of claim 11, in which the activation parameters are based at least in part on at least one of a serving cell PRACH configuration, a neighbor cell PRACH configuration, or a combination thereof.

14. The apparatus of claim 11, in which the PRACH signature sequence does not trigger a PRACH procedure.

15. The apparatus of claim 11, in which determining the proximity of the active UE occurs subsequent to dynamic or periodic triggering of:
a PRACH transmission, or
a backward handover procedure.

16. A non-transitory computer-readable medium having program code recorded thereon for wireless communication, the program code comprising:
program code to receive, at a low power node from a base station, activation parameters to activate the low power node to detect an uplink transmission between an active user equipment (UE) and the base station;
program code to determine, at the low power node, a proximity of the active user equipment (UE) relative to the low power node upon detecting the uplink transmission based at least in part on the activation parameters, the uplink transmission transmitted in response to a trigger directly transmitted from the base station to the active UE, and the activation parameters indicating at least one of a physical random access channel (PRACH) signature sequence space, time resources, frequency resources, or a combination thereof, of the uplink transmission; and program code to initiate, at the low power node, an activation sequence between the low power node and the base station after determining the proximity of the active UE.

17. The non-transitory computer-readable medium of claim 16, in which the program code further comprises:

program code to transmit an activation request when the proximity of the active UE is determined; and program code to receive an activation grant in response to the activation request, the activation grant being received prior to the initiating of the activation sequence.

* * * * *